(12) United States Patent
Kim et al.

(10) Patent No.: US 8,696,959 B2
(45) Date of Patent: Apr. 15, 2014

(54) PRODUCTION METHOD OF BUILDING MATERIALS AND VESSELS USING ENVIRONMENT-FRIENDLY YELLOW EARTH

(75) Inventors: Young-Bok Kim, Gyeonggi-do (KR); Myung-Ja Kim, Incheon-si (KR)

(73) Assignee: Industry-Academic Cooperation Foundation, The Catholic University of Korea, Seoul (KR)

( * ) Notice: Subject to any disclaimer, the term of this patent is extended or adjusted under 35 U.S.C. 154(b) by 630 days.

(21) Appl. No.: 12/514,492

(22) PCT Filed: Oct. 2, 2007

(86) PCT No.: PCT/KR2007/004815
§ 371 (c)(1),
(2), (4) Date: Dec. 15, 2009

(87) PCT Pub. No.: WO2008/062946
PCT Pub. Date: May 29, 2008

(65) Prior Publication Data
US 2010/0133712 A1    Jun. 3, 2010

(30) Foreign Application Priority Data
Nov. 21, 2006    (KR) .................. 10-2006-0114869
Sep. 27, 2007    (KR) .................. 10-2007-0097236

(51) Int. Cl.
*B29C 43/02*    (2006.01)
(52) U.S. Cl.
USPC .................. 264/122; 264/299; 264/319
(58) Field of Classification Search
USPC .................. 264/122, 299, 319
See application file for complete search history.

(56) References Cited

U.S. PATENT DOCUMENTS 5,075,057 A * 12/1991 Hoedl .................. 264/115
6,790,394 B2    9/2004 Kim

FOREIGN PATENT DOCUMENTS

| GB | 774 805 A | 5/1957 |
|---|---|---|
| JP | 60201913 A | 10/1985 |
| JP | 2002-034343 | 2/2002 |
| JP | 2002-307416 | 10/2002 |
| KR | 10-2001-0074099 A | 8/2001 |
| KR | 200241744 | 9/2001 |
| KR | 10-2002-0056816 A | 7/2002 |
| KR | 2002 0076663 A | 10/2002 |
| KR | 10-2003-0019012 A | 3/2003 |
| KR | 2003 0024308 A | 3/2003 |
| KR | 2003 0088551 A | 11/2003 |

(Continued)

OTHER PUBLICATIONS

J. Ogando "Crosslinked PE can be recycled" Plastics Technology, (1992).

(Continued)

*Primary Examiner* — James Sanders
(74) *Attorney, Agent, or Firm* — Merchant & Gould

(57) ABSTRACT

A method of producing a building material using environment-friendly loess, comprising: preparing an environment-friendly composition by mixing 70~90 percent by weight of at least one selected from among loess, kaolin, and clay, 3~23 percent by weight of a resin coating agent, 0.1~5 percent by weight of an inorganic pigment, and 1~5 percent by weight of water; and molding the environment-friendly composition at 10 second~20 minute intervals by introducing it into a molding machine having a temperature of 80~140° C. and an internal pressure of 1~20 kg/cm².

7 Claims, 1 Drawing Sheet

(56) References Cited

FOREIGN PATENT DOCUMENTS

| | | |
|---|---|---|
| KR | 10-2005-0074049 A | 7/2005 |
| KR | 10-2006-0037617 A | 5/2006 |
| KR | 100623579 B1 | 9/2006 |
| WO | WO 02/053372 A1 | 7/2002 |

OTHER PUBLICATIONS

International Search Report, PCT/KR2007/004815, Apr. 2007.

* cited by examiner

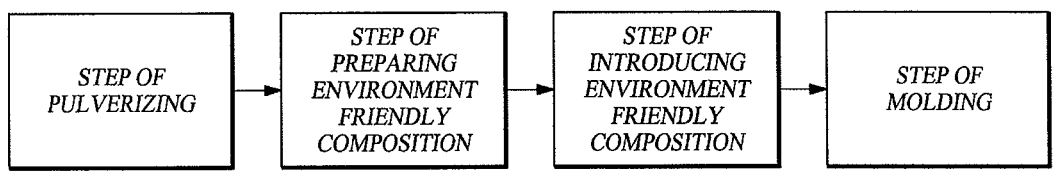

PRODUCTION METHOD OF BUILDING MATERIALS AND VESSELS USING ENVIRONMENT-FRIENDLY YELLOW EARTH

PRIORITY

The present application is a national stage application of PCT/KR07/004,815, filed on Oct. 2, 2007, which claims priority to Korean patent application 10-2007-0097236, filed on Sep. 27, 2007, and Korean patent application 10-2006-0114869, filed on Nov. 21, 2006.

TECHNICAL FIELD

The present invention relates to a method of producing a building material and a container using environment-friendly soil, and, more particularly, to a method of producing a building material and a container using environment-friendly soil, which can be used to produce a building material and a container having excellent air permeability, flame retardancy, chemical resistance, durability and environment-friendly properties by mixing loess with a resin coating agent, an inorganic pigment and water and then molding the mixture at a predetermined temperature and pressure.

BACKGROUND

Many inexpensive building materials and containers found in various applications in daily life are based on plastic. Such plastic building materials and containers have become established as essential products in modern society thanks to their various advantages including convenience of use, applicability for various forms, lightness, etc.

However, these products have many problems. For example, they generate environmental endocrine disruptors, which are harmful to the human body. Further, it takes a greatly long period of time for plastic products to naturally degrade, destroying the natural ecosystem. The incineration of plastic products leaves harmful materials. Besides, plastic products make it difficult to suppress a fire because they have high combustibility.

In order to solve the above problems, Korean Patent No. 423023 discloses a fire-resistant panel including environment-friendly and helpful loess and a fire-resistant decorative panel using the same. However, since the fire-resistant panel and fire-resistant decorative panel are manufactured to have a multi-layered structure, there is a problem in that the production cost thereof is increased, and thus it is difficult to apply them to cheap building materials and containers.

Further, Korean Unexamined Patent Publication No. 2003-0019012 discloses a functional polymer composition including starch and a method of producing a nonpolluting molding using the same. However, the nonpolluting molding has a problem in that starch is water-soluble, and thus water oozes therefrom.

Further, Korean Unexamined Patent Publication No. 2006-0037617 discloses a method of preparing a melamine resin using jade, mineral stone, loess and violet quartz, and products thereof. However, in this patent document, the products other than loess are expensive, and technologies for variously coloring the products are not described.

Technical Problem

Accordingly, the present invention has been made keeping in mind the above problems occurring in the prior art, and an object of the present invention is to provide a method of producing a building material using environment-friendly loess, which can produce a building material having excellent air permeability, flame retardancy, fire resistance, water resistance and durability, and in which the production cost thereof is low and the manufacturing process thereof is simple.

In order to accomplish the object, the present invention provides a method of producing a building material using environment-friendly loess, including: preparing an environment-friendly composition by mixing 10~90 parts by weight of at least one selected from among loess, kaolin, clay and grayish blue powdered soil, 3~50 parts by weight of a resin coating agent, 0.1~25 parts by weight of an inorganic pigment, and 1~60 parts by weight of water; and molding the environment-friendly composition at 10 second~20 minute intervals by introducing it into a molding machine having a temperature of 50~550° C. and an internal pressure of 1~20 $kg/cm^2$.

Another object of the present invention is to provide a method of producing a container using environment-friendly loess, by which the container can be produced at low cost and provided with various colors and shapes and excellent properties including durability, water resistance, chemical resistance and air permeability.

In order to accomplish the object, the present invention provides a method of producing a container using environment-friendly loess, including: preparing an environment-friendly composition by mixing 10~90 parts by weight of at least one selected from among loess, kaolin, clay and grayish blue powdered soil, 3~50 parts by weight of a resin coating agent, 0.1~25 parts by weight of an inorganic pigment, and 1~60 parts by weight of water; and molding the environment-friendly composition at 10 second~20 minute intervals by introducing it into a molding machine having a temperature of 50~450° C. and an internal pressure of 1~10 $kg/cm^2$.

Technical Solution

In an aspect, the present invention provides a method of producing a building material using environment-friendly loess, including: preparing an environment-friendly composition by mixing 10~90 parts by weight of at least one selected from among loess, kaolin, clay and grayish blue powdered soil, 3~50 parts by weight of a resin coating agent, 0.1~25 parts by weight of an inorganic pigment, and 1~60 parts by weight of water; and molding the environment-friendly composition at 10 second~20 minute intervals by introducing it into a molding machine having a temperature of 50~550° C. and an internal pressure of 1~20 $kg/cm^2$.

Specifically, as shown in FIG. 1, the method of producing a building material using environment-friendly loess includes the steps of pulverizing loess, kaolin, clay and grayish blue powdered soil, preparing an environment-friendly composition, introducing the environment-friendly composition into a molding machine, and molding the environment-friendly composition in the molding machine. That is, in the method, the building material is produced by mixing the loess, kaolin, clay and grayish blue powdered soil with a resin coating agent, an inorganic agent and water, introducing the mixture into the molding machine, and then molding the mixture in the molding machine. The phenomena in which the building material cracks when it dries and the building material is weakly resistant to water are overcome by mixing the loess, kaolin, clay and grayish blue powdered soil with a resin coating agent and water, and thus the building material has uniform water resistance, moisture resistance, flame retardancy and fire resistance. The building material does not generate harmful materials when burned. Since the building material includes an inorganic pigment, the building material can be formed into products having various colors and uses. Further, in the method, since the building material is produced through a process of introducing the environment-friendly composition into the molding machine and then molding it for several seconds to several minutes, instead of a process of manufacturing ceramic ware or a tile, requiring a lot of time and effort, the building material is easily separated from dies even though it is not glazed, is environment-friendly, and the production cost thereof is reduced.

Here, since the environment-friendly composition includes loess, kaolin, clay and grayish blue powdered soil, and also includes a large amount of helpful microbes, it is porous, emits far infrared rays, and exhibits heat resistance, air permeability and moisture permeability. Further, the environment-friendly composition does not generate harmful materials when incinerated, and does not discharge harmful deposited materials at the time of disposal thereof, and thus it is friendly to the human body and the environment.

The loess, kaolin, clay and grayish blue powdered soil may be general loess, kaolin, clay and grayish blue powdered soil produced in domestic or other countries.

Since loess has a porous structure, it exhibits excellent hygroscopicity and moisture resistance, and prevents dew condensation. Loess maintains a comfortable indoor temperature and indoor humidity in summer, and prevents cold wind from flowing indoors in winter. That is, loess has an adiabatic effect. Further, loess, which is an inorganic non-combustible material, exhibits fire resistance, does not burn in the event of a fire, and does not emit noxious gases. Moreover, loess is characterized in that it adsorbs and neutralizes cigarette smoke and noxious gases, and inhibits and detoxifies bad smells, molds and harmful viruses. Furthermore, since loess is porous, it exhibits sound insulation properties for reducing short-distance transmission of sound, adsorbs harmful electromagnetic waves, and emits far infrared rays.

Kaolin has similar properties to those of loess. Since kaolin has a porous structure, it exhibits hygroscopicity and air permeability, changes acidic water into alkaline water, and improves the aesthetic sense of ceramic ware produced using kaolin as a raw material for the ceramic ware.

Grayish blue powdered soil has similar properties to those of loess. Grayish blue powdered soil improves the aesthetic sense of ceramic ware produced using kaolin as a raw material for the ceramic ware.

Clay has similar properties to those of kaolin. The clay is characterized in that it has a desirable color.

When the amount of at least one of the loess, kaolin, clay and grayish blue powdered soil is below 10 parts by weight, there is a problem in that it is difficult to form the building material into a desired shape and pattern. In contrast, when the amount thereof is above 90 parts by weight, there is a problem in that the building material is easily cracked.

The resin coating agent, which is included in the environment-friendly composition together with water, serves to produce a building material which is not cracked and is not decomposed by water, when the loess, kaolin, clay and grayish blue powdered soil are formed into the building material and then dried.

When the amount of the resin coating agent is below 3 parts by weight, there is a problem in that it is difficult to form a building material, and the building material is cracked or is decomposed by water. In contrast, when the amount thereof is above 50 parts by weight, there is a problem in that it takes a lot of time to biodegrade the building material.

Further, the inorganic pigment is conveniently used to impart colors to the building material depending on the use thereof.

When the amount of the inorganic pigment is below 0.1 parts by weight, there is a problem in that the building material is not clearly colored. In contrast, when the amount thereof is above 25 parts by weight, there is a problem in that the beauty of the building material is decreased.

Here, the water is an essential component used to combine the loess, kaolin, clay and grayish blue powdered soil when they are heated and pressurized.

When the amount of water is below 1 part by weight, there is a problem in that it is difficult to mold the environment friendly composition into the building material. In contrast, when the amount thereof is above 60 parts by weight, there is a problem in that the water resistance of the building material is decreased.

The environment-friendly composition further includes 5~300 parts by weight of at least one of agricultural byproducts including chaff, straw, cornstalk, and hay, or 5~300 parts by weight of at least one of timber byproducts including sawdust, waste timber, and bark.

The agricultural byproducts including chaff, straw, cornstalk and hay are pulverized to a size of 0.001~2 mm and are then added to the environment-friendly composition, and the timber byproducts including sawdust, waste timber, and bark are pulverized to a size of 0.001~2 mm and then added to the environment-friendly composition.

The agricultural byproduct and the timber product are dried, pulverized into powder, and then added to the environment-friendly composition, separately or together.

When the amount of the agricultural byproduct is below 5 parts by weight, there is a problem in that the durability of the building material is decreased. In contrast, when the amount thereof is above 300 parts by weight, there is a problem in that the building material becomes crumbly.

When the amount of the timber byproduct is below 5 parts by weight, there is a problem in that the durability of the building material is decreased. In contrast, when the amount thereof is above 300 parts by weight, there is a problem in that the building material becomes coarse.

The resin coating agent is any one selected from among melamine resin, modified melamine resin, modified melamine-urea resin, urea resin, modified urea resin, phenol resin, modified phenol resin, modified phenol-urea resin, modified phenol-melamine resin, polyester resin, polyurethane resin, and epoxy resin.

The melamine resin, which is a kind of amino resin, has excellent flame retardancy, water resistance and chemical resistance, has high transparency and strength, is smooth to the touch, has excellent electrical properties, and has very low hygroscopicity. The urea resin, which is a kind of amino resin, is well colored and is easily cured at room temperature. The phenol resin is molded into a product at low temperature even though it has heat resistance, and has high strength. The polyester resin is transparent, and has high strength and excellent chemical resistance. The epoxy resin has excellent chemical resistance and high strength, and, when the epoxy resin is molded into a product, the reduction in volume of the epoxy resin is small. Further, the inorganic pigment includes at least one selected from among iron oxide, zinc oxide, calcium carbonate, and titanium dioxide.

When the inorganic pigment is not added to the environment-friendly composition, the color or quality appearance of the building material produced using the environment-friendly composition, including the loess, kaolin, clay and grayish blue powdered soil, without the inorganic pigment, visually appears coarse. Conversely, when the inorganic pigment is added thereto, the color or quality appearance thereof visually appears luxurious and smooth.

The iron oxide has various colors, such as red, yellow, brown, blue, green, orange, ivory, gray, etc., and it is possible to mix the colors.

Since the zinc oxide, calcium carbonate and titanium dioxide are white, a white color may be obtained by using them independently or in combination, or various colors may be obtained by mixing them with the iron oxide.

The loess, kaolin, clay or grayish blue powdered soil is dried, and is then pulverized into fine powder having a size of 0.001~0.2 mm.

After the loess, kaolin, clay or grayish blue powdered soil is unearthed from the source thereof and impurities are then removed therefrom, it is pulverized into fine powder having the above size, and is then added to the environment-friendly composition.

The method of producing a building material using environment-friendly loess further includes the steps of drying the waste material discarded or damaged in the molding of the environment-friendly composition, and then pulverizing the dried waste material; and mixing the waste material with the resin coating agent, inorganic pigment and water, and then molding the mixture using the molding machine.

In this way, the environment-friendly building material is formed into a solid and smooth product.

The environment-friendly building material includes panels, outer wall materials, inner wall materials, roof materials, ceiling materials, floor materials, interior materials, and heating materials.

Since the environment-friendly building material includes the loess, kaolin, clay or grayish blue powdered soil, it is porous. Since it includes a large amount of helpful microbes, it emits far infrared rays, and exhibits heat resistance, air permeability and moisture permeability. Further, since it includes the resin coating agent, water and inorganic pigment, it exhibits durability and various colors. Therefore, the environment-friendly building material can be used as various building materials depending on the intended use thereof.

In another aspect, the present invention provides a method of producing a container using environment-friendly loess, including: preparing an environment-friendly composition by mixing 10~90 parts by weight of at least one selected from among loess, kaolin, clay and grayish blue powdered soil, 3~50 parts by weight of a resin coating agent, 0.1~25 parts by weight of an inorganic pigment, and 1~60 parts by weight of water; and molding the environment-friendly composition at 10 second~20 minute intervals by introducing it into a molding machine having a temperature of 50~450° C. and an internal pressure of 1~10 kg/cm$^2$.

Specifically, as shown in FIG. 1, the method of producing a container using environment-friendly loess includes the steps of pulverizing loess, kaolin, clay and grayish blue powdered soil, preparing an environment-friendly composition, introducing the environment-friendly composition into a molding machine, and molding the environment-friendly composition in the molding machine.

In the method of producing a container using environment-friendly loess, the same composition as in the method of producing a building material using environment-friendly loess is used. Since the container is lighter than the building material, the molding temperature, pressure and time of the composition in the method of producing a container are lower than those in the method of producing a building material. Therefore, the container is produced using the same method as the method of producing a building material, except that the composition is molded into the container in a molding machine having a lower molding temperature and pressure than those in the method of producing a building material in a short time.

Hereinafter, the method of producing a container using environment-friendly loess will be described while partially quoting the method of producing a building material using environment-friendly loess.

Here, since the environment-friendly composition includes loess, kaolin, clay and grayish blue powdered soil, and also includes a large amount of helpful microbes, it is porous, emits far infrared rays, and exhibits heat resistance, air permeability and moisture permeability. Further, the environment-friendly composition does not generated harmful materials when incinerated, and does not discharge harmful deposited materials at the time of disposal thereof, and thus it is friendly to the human body and the environment.

The environment-friendly composition further includes 5~300 parts by weight of at least one of agricultural byproducts including chaff, straw, cornstalk, and hay, or 5~300 parts by weight of at least one of timber byproducts including sawdust, waste timber, and bark.

Further, the agricultural byproducts, including chaff, straw, cornstalk and hay, are pulverized to a size of 0.001~2 mm and are then added to the environment-friendly composition, and the timber byproducts, including sawdust, waste timber, and bark, are pulverized to a size of 0.001~2 mm and are then added to the environment-friendly composition.

The resin coating agent is any one selected from among melamine resin, modified melamine resin, modified melamine-urea resin, urea resin, modified urea resin, phenol resin, modified phenol resin, modified phenol-urea resin, modified phenol-melamine resin, polyester resin, polyurethane resin, and epoxy resin.

The inorganic pigment includes at least one selected from among iron oxide, zinc oxide, calcium carbonate, and titanium dioxide.

The loess, kaolin, clay or grayish blue powdered soil is dried, and is then pulverized into fine powder having a size of 0.001~0.2 mm.

The method of producing a container using environment-friendly loess further includes the steps of drying the waste material discarded or damaged in the molding the environment-friendly composition, and then pulverizing the dried waste material; and mixing the waste material with the resin coating agent, inorganic pigment and water, and then molding the mixed waste material using the molding machine.

The environment-friendly container includes a vessel, a flowerpot, a jar, a bowl, a cup, a pan, and a dish.

Here, since the environment-friendly container includes the loess, kaolin, clay or grayish blue powdered soil, it is porous. Since it includes a large amount of microbes, it emits far infrared rays, and exhibits heat resistance, air permeability and moisture permeability. Further, since it includes the resin coating agent, water and inorganic pigment, it exhibits durability and various colors. Therefore, the environment-friendly container can be used as various containers depending on the intended use thereof.

Advantageous Effects

As described above, the method of producing a building material and a container using environment-friendly loess according to the present invention is advantageous in that, since an environment-friendly building material and container are produced by molding an environment-friendly composition for a short time using a molding machine having a predetermined temperature and pressure, unlike a method of manufacturing ceramic ware, the production cost thereof is reduced, and the produced environment-friendly building material and container have excellent durability, water resistance, flame retardancy, fire resistance, air permeability and chemical resistance, and thus the method is economical. Further, the method of producing a building material and a container using environment-friendly loess according to the present invention is highly advantageous in that, since a building material and a container are produced using an environment-friendly composition including loess etc., the produced building material and container do not generate harmful gas, have excellent flame retardancy, do not generate environmental endocrine disruptors, but emit far infrared rays, which are helpful to the human body. Further, the building material and container produced using the environment-friendly loess have an advantage in that harmful materials are not generated at the time of disposal thereof, and only a small amount of harmful byproducts is generated.

DESCRIPTION OF DRAWINGS

FIG. 1 is a block diagram showing a method of producing a building material and a container using environment-friendly loess according to the present invention.

EXAMPLES

Hereinafter, the present invention will be described in detail with reference to Examples. Here, these Examples are set forth to illustrate the present invention, but should not be construed as the limit of the present invention.

Examples 1~10

Method of Preparing Environment-Friendly Composition Using Melamine Resin Coating Agent Environment-friendly compositions were prepared as given in Table 1. First, loess, kaolin, or grayish blue powdered soil was dried, and was then pulverized into fine powder having a size of 0.001~0.05 mm. Subsequently, chaff was dried, and was then pulverized into powder having a size of about 0.001~0.01 mm. Subsequently, the loess, kaolin, or grayish blue powdered soil was mixed with a melamine resin coating agent, an inorganic pigment for coloring, and water, as given in Table 1, thus preparing the environment-friendly compositions. Here, titanium dioxide was used as the white inorganic pigment, and iron oxide was used as the colored inorganic pigment. The inorganic pigment was manufactured by Wooshin Pigment Corp.

TABLE 1

| Classification | Color | Components of composition | Amount (parts by weight) |
|---|---|---|---|
| Example 1 | Red (ocher) | Loess | 2400 |
| | | Melamine resin coating agent | 600 |
| | | Inorganic pigment (red) | 20 |
| | | Water | 180 |
| Example 2 | White | Kaolin | 2400 |
| | | Melamine resin coating agent | 600 |
| | | Inorganic pigment (white) | 150 |
| | | Water | 160 |
| Example 3 | Pink | grayish blue powdered soil | 2400 |
| | | Melamine resin coating agent | 600 |
| | | Inorganic pigment (white) | 35 |
| | | Inorganic pigment (red) | 5 |
| | | Water | 150 |
| Example 4 | Red (ocher) | Loess | 1800 |
| | | Melamine resin coating agent | 750 |
| | | Chaff | 450 |
| | | Inorganic pigment (red) | 50 |
| | | Water | 190 |
| Example 5 | White | Kaolin | 1800 |
| | | Melamine resin coating agent | 750 |
| | | Chaff | 450 |
| | | Inorganic pigment (white) | 200 |
| | | Water | 160 |
| Example 6 | Red (ocher) | Loess | 1200 |
| | | Chaff | 1200 |
| | | Melamine resin coating agent | 600 |
| | | Inorganic pigment (red) | 50 |
| | | Water | 450 |
| Example 7 | White | Kaolin | 1200 |
| | | Chaff | 1200 |
| | | Melamine resin coating agent | 600 |
| | | Inorganic pigment (white) | 150 |
| | | Water | 400 |
| Example 8 | Red (ocher) | Loess | 600 |
| | | Chaff | 1800 |
| | | Melamine resin coating agent | 600 |
| | | Inorganic pigment (red) | 50 |
| | | Water | 450 |
| Example 9 | White | Kaolin | 600 |
| | | Chaff | 1800 |
| | | Melamine resin coating agent | 600 |
| | | Inorganic pigment (white) | 150 |
| | | Water | 400 |
| Example 10 | Red | Loess | 2250 |
| | | Melamine resin coating agent | 750 |
| | | Inorganic pigment (red) | 50 |
| | | Water | 180 |

Examples 11~20

Method of Producing Environment-Friendly Building Material and Container Using Melamine Resin Coating Agent Environment-friendly building materials and containers were produced as given in Table 2. The environment-friendly compositions in Examples 11~20 were prepared using the same method as in Examples 1~10, except that the amounts and components of the environment-friendly compositions in Examples 11~20 were different from those of the environment-friendly compositions in Examples 1~10. Subsequently, the environment-friendly compositions in Examples 11~20 were molded into a building material and a container for the molding times in Examples 11~20 and at the molding pressures in Examples 11~20 using a molding machine having a temperature of 140° C. The building material and container molded in the molding machine were separated from dies immediately after the molding. In this case, glazes or release agents were not used. No harmful materials were detected in the building material or in the container.

TABLE 2

| Class. | Applied product | Component of composition | Amount (parts by weight) | Molding time (sec) | Molding pressure (kg/cm²) |
|---|---|---|---|---|---|
| Example 11 | Oden vessel (white) | Kaolin | 1800 | 60 | 8 |
| | | Melamine resin coating agent | 750 | | |
| | | Chaff | 450 | | |
| | | Inorganic pigment (white) | 200 | | |
| | | water | 160 | | |
| Example 12 | Oden vessel (red) | Loess | 1800 | 50 | 6 |
| | | Melamine resin coating agent | 750 | | |
| | | Chaff | 450 | | |
| | | Inorganic pigment (red) | 20 | | |
| | | water | 190 | | |
| Example 13 | Oden vessel (yellow) | Loess | 1800 | 50 | 6 |
| | | Melamine resin coating agent | 750 | | |
| | | Chaff | 450 | | |
| | | Inorganic pigment (yellow) | 70 | | |
| | | Inorganic pigment (white) | 30 | | |
| | | water | 180 | | |
| Example 14 | Oden vessel (pink) | grayish blue powdered soil | 2400 | 60 | 8 |
| | | Melamine resin coating agent | 600 | | |
| | | Inorganic pigment (white) | 35 | | |
| | | Inorganic pigment (red) | 5 | | |
| | | water | 150 | | |
| Example 15 | Noodle vessel (red) | Loess | 2250 | 110 | 6 |
| | | Melamine resin coating agent | 750 | | |
| | | Inorganic pigment (red) | 50 | | |
| | | water | 180 | | |
| Example 16 | Noodle vessel (white) | Kaolin | 2400 | 120 | 8 |
| | | Melamine resin coating agent | 600 | | |
| | | Inorganic pigment (white) | 150 | | |
| | | water | 160 | | |
| Example 17 | Rectangular tray (red) | Loess | 1800 | 55 | 6 |
| | | Melamine resin coating agent | 750 | | |
| | | Chaff | 450 | | |
| | | Inorganic pigment (red) | 20 | | |
| | | water | 200 | | |
| Example 18 | Building material 5 mm | Kaolin | 1950 | 120 | 15 |
| | | Melamine resin coating agent | 600 | | |
| | | Chaff | 450 | | |
| | | Inorganic pigment (white) | 150 | | |
| | | water | 180 | | |
| Example 19 | Building material 10 mm | Loess | 1800 | 300 | 15 |
| | | Melamine resin coating agent | 750 | | |
| | | Chaff | 450 | | |
| | | Inorganic pigment (red) | 20 | | |
| | | water | 190 | | |
| Example 20 | Building material 11 mm or more | Loess | 2250 | 450 (it is increased according to thickness) | 15 |
| | | Melamine resin coating agent | 800 | | |
| | | Chaff | 650 | | |
| | | Inorganic pigment (red) | 10 | | |
| | | water | 300 | | |

Examples 21~30

Method of Producing Environment-Friendly Composition Using Urea Resin Coating Agent Environment-friendly compositions in Example 21~30 were prepared using the same method as in Example 1~10, except that a urea resin coating agent was used instead of the melamine resin coating agent in Table 1.

Examples 31~40

Method of Producing Environment-Friendly Building Material and Container Using Urea Resin Coating Agent Environment-friendly building materials and containers in Example 31~40 were produced using the same method as in Example 11~20, except that a urea resin coating agent was used instead of the melamine resin coating agent in Table 2. No harmful materials were detected in the building material or in the container.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The method of producing a building material and a container using environment-friendly loess according to the present invention is a method of producing a light and environment-friendly building material and container at low cost. The method of the present invention is economical and is expected to greatly contribute to related industries.

What is claimed is:

1. A method of producing a building material using environment-friendly loess, comprising:
   preparing an environment-friendly composition by mixing 70-80 percent by weight of a loess, 16.9-24 percent by weight of a melamine resin coating agent, 0.1-5 percent by weight of an inorganic pigment, and 3-8 percent by weight of water; and
   molding the environment-friendly composition at 10 second~20 minute intervals by introducing it into a molding machine having a temperature of 80°~140° C. and an internal pressure of 1~20 kg/cm$^2$.

2. The method of producing a building material using environment-friendly loess according to claim 1, wherein the environment-friendly composition further comprises 10~50 percent by total weight of the environment-friendly composition of at least one of agricultural byproducts including chaff, straw, cornstalk, and hay, or 10-50 percent by weight of at least one of timber byproducts including sawdust, waste timber, and bark.

3. The method of producing a building material using environment-friendly loess according to claim 2,
   wherein the agricultural byproduct, including chaff, straw, cornstalk and hay, is pulverized to a size of 0.001~2 mm, and
   the timber byproduct, including sawdust, waste timber, and bark, is pulverized to a size of 0.001~2 mm.

4. The method of producing a building material using environment-friendly loess according to claim 1, wherein the inorganic pigment includes at least one selected from among iron oxide, zinc oxide, calcium carbonate, and titanium dioxide.

5. The method of producing a building material using environment-friendly loess according to claim 1, wherein the loess is dried, and is then pulverized into fine powder having a size of 0.001~0.2 mM.

6. The method of producing a building material using environment-friendly loess according to claim 1, further comprising:
   drying the waste material, discarded or damaged in the molding the environment-friendly composition, and then pulverizing the dried waste material; and
   mixing the waste material with the resin coating agent, inorganic pigment and water, and then molding the mixed waste material using the molding machine.

7. The method of producing a building material using environment-friendly loess according to claim 1, wherein the environment-friendly building material includes panels, outer wall materials, inner wall materials, roof materials, ceiling materials, floor materials, interior materials, and heating materials.

* * * * *

UNITED STATES PATENT AND TRADEMARK OFFICE
CERTIFICATE OF CORRECTION

PATENT NO. : 8,696,959 B2  
APPLICATION NO. : 12/514492  
DATED : April 15, 2014  
INVENTOR(S) : Kim et al.

It is certified that error appears in the above-identified patent and that said Letters Patent is hereby corrected as shown below:

Title Page

Change Item (75) to Item (76).

Item (73) Assignee: "Industry-Academic Cooperation Foundation, The Catholic University of Korea, Seoul (KR)" should be deleted.

Signed and Sealed this
Twenty-first Day of April, 2015

Michelle K. Lee
*Director of the United States Patent and Trademark Office*